United States Patent
Brezinski

(10) Patent No.: US 9,225,730 B1
(45) Date of Patent: Dec. 29, 2015

(54) GRAPH BASED DETECTION OF ANOMALOUS ACTIVITY

(71) Applicant: AMAZON TECHNOLOGIES, INC., Reno, NV (US)

(72) Inventor: Dominique Imjya Brezinski, Henderson, NV (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 14/219,819

(22) Filed: Mar. 19, 2014

(51) Int. Cl.
  *H04L 29/06* (2006.01)
  *G06F 21/00* (2013.01)

(52) U.S. Cl.
  CPC .............. *H04L 63/14* (2013.01); *G06F 21/00* (2013.01)

(58) Field of Classification Search
  CPC .............................. G06F 21/00; G06F 21/552
  USPC ........................................................... 726/23
  See application file for complete search history.

(56) References Cited

U.S. PATENT DOCUMENTS

| | | | |
|---|---|---|---|
| 2010/0095374 A1* | 4/2010 | Gillum et al. | 726/22 |
| 2012/0137367 A1* | 5/2012 | Dupont et al. | 726/25 |

\* cited by examiner

*Primary Examiner* — Jason K Gee
(74) *Attorney, Agent, or Firm* — Lindauer Law, PLLC

(57) ABSTRACT

Techniques are described for graph-based analysis of event data in a computing environment. Event data is collected from host devices, the event data describing events in which devices, processes, or services are accessed in the environment. The event data is arranged into a graph that includes vertices corresponding to devices, processes, or services, and edges that connect pairs of vertices. Each edge may identify an event by connecting two vertices corresponding to two devices, processes, or services included in the event. A rarity metric is determined for each edge, indicating a rarity of events of a particular type connecting two vertices. A risk metric may also be determined for each edge, indicating a security risk associated with the event type or the target of the event. The graph may be traversed according to the risk and rarity metrics, to identify patterns of anomalous activity in the event data.

20 Claims, 11 Drawing Sheets

GRAPH BASED DETECTION OF ANOMALOUS ACTIVITY

BACKGROUND

Providers of online services or other computing services may deploy a large number of computing devices to execute processes and services within a computing environment. Such large deployments may enable an organization to maintain quality of service under a variety of operating conditions. However, a complex deployment of a large number of computing devices may create challenges when ensuring the security, confidentiality, and integrity of the information stored on the computing devices.

Figure 1:
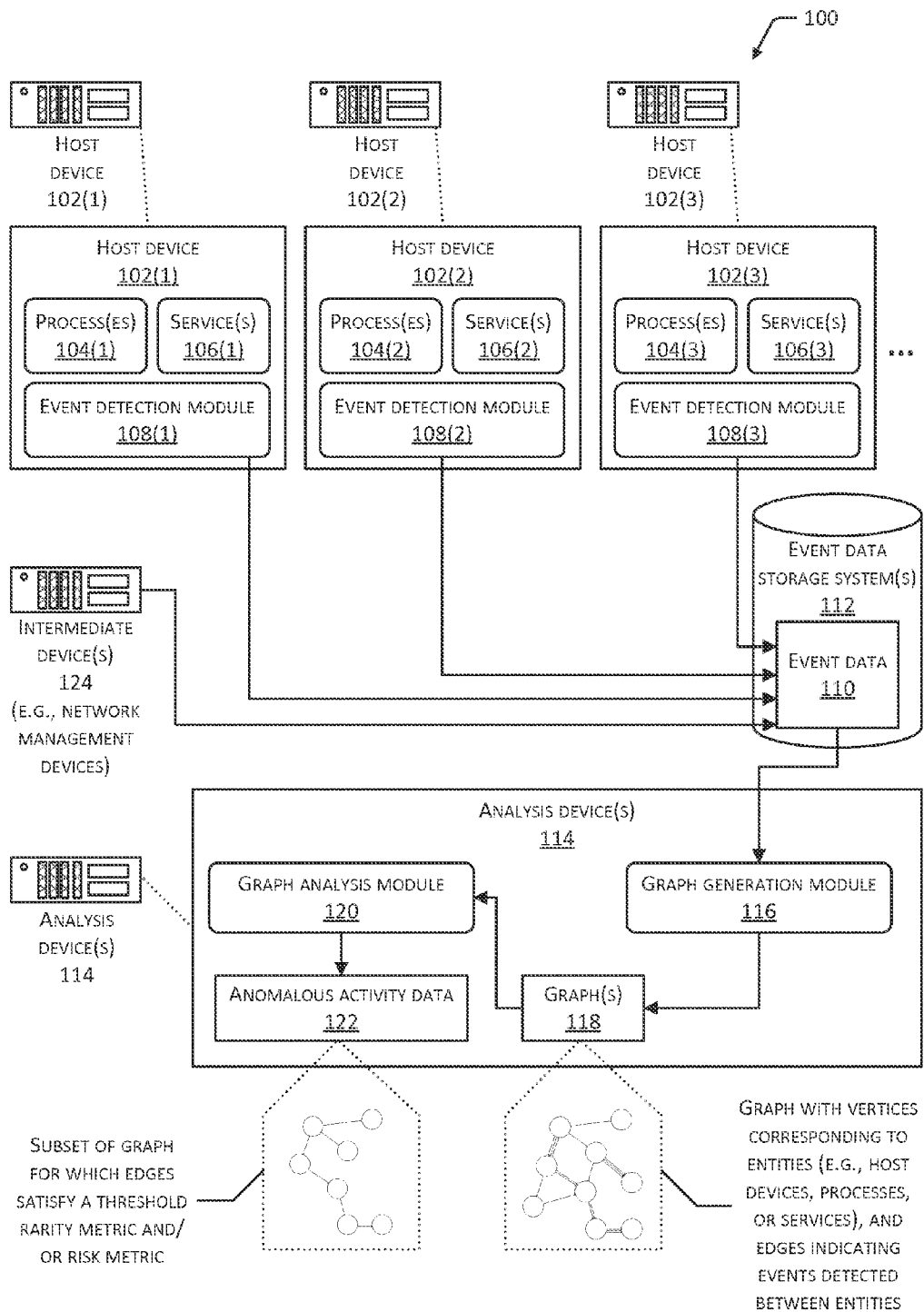
FIG. 1 depicts an environment including one or more analysis devices that perform operations to generate one or more graphs based on event data collected on a plurality of host devices, and to analyze the graph(s) to detect anomalous activity on the host device(s).

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for determining a graph that correlates a plurality of events detected on host devices, and for identifying anomalous activity by traversing the graph according to one or both of a rarity metric and a risk metric associated with elements of the graph. Event data may be collected by monitoring activities on one or more host devices in a computing environment, and the event data may describe a plurality of events that have occurred in the computing environment. In some implementations, each event may correspond to an interaction between two entities in a computing environment, the two entities including two of a host device, a process executing on a host device, or a service provided on a host device. For example, the event data may describe a plurality of events associated with interactions between entities in a computing environment. Such accesses may include, but are not limited to, logins, network connections, file accesses, database accesses, and so forth. The event data may also describe a plurality of events associated with interactions between an entity and processes or services executing on the host devices, such interactions including but not limited to a process start, suspension, or termination, calls to a process or service interface, and so forth.

The collected event data may be analyzed to generate a graph that interrelates or correlates a plurality of events. A graph is a representation of a plurality of objects and one or more relationships between one or more pairs of the objects. A graph may represent each of the plurality of objects as a vertex (e.g., a node) and each of the relationships between objects as an edge (e.g., link). A graph may include any number of vertices and any number of edges relating any number of pairs of the vertices. A graph may be described mathematically, or depicted graphically, in a space that includes any number of dimensions. In some cases a graph may be a directed graph, such that one or more edges relate pair(s) of vertices with a directionality (e.g., from a first vertex to a second vertex).

In implementations, the collected event data may be employed to generate a graph that includes a plurality of vertices, each vertex corresponding to an entity (e.g., a host device, process, or service) in a computing environment. Implementations also support the use of vertices corresponding to other types of entities, such as users, data files, and so forth. The graph may include any number of edges, each edge connecting two vertices to indicate an event involving the two entities corresponding to the two connected vertices. An edge may include a timestamp attribute indicating a time (e.g., and date) when the event occurred. An edge may also include a user attribute indicating a user involved in the event, such as the user whose credentials were employed to access (e.g., log in to) a host device or service, or whose credentials were employed to establish a network connection with a host device. An edge may also include a type attribute indicating a type of the event corresponding to an edge, such as a network connection, a login or user authentication to a service or host device, a file access, a database access, a process launch, a remote procedure call, a local procedure call, and so forth.

In some implementations, an edge corresponding to an event may include a risk metric indicating a level of security risk associated with the event, or associated with the entities involved in the event. In some cases, the risk metric may be higher if the event has a potential to access sensitive, confidential, or private information, or if the event is accessing host devices, processes, services, or data that enable access to sensitive, confidential, or private information. For example, an edge corresponding to a network connection may include a higher risk metric for a secured network connection (e.g., secured using a cryptographic method, a certificate, or otherwise) than for an unsecured (e.g., unencrypted) network connection, given that a secured network connection may enable access to more sensitive host devices, services, or stored information. An edge corresponding to a file or database access may include a higher risk metric if the accessed information is confidential, sensitive, private, or enables subsequent accesses. For example, a higher risk metric may be assigned to an event that is an access to a password file. In some cases, the risk metric may be assigned based on a user associated with the event. For example, a high risk metric may be assigned to activities involving a root user or other user with administrative privileges, given such a user's high level of access to host devices, processes, services, or stored information on the host device(s).

The risk metric for an edge may be determined by accessing security risk data which provides a risk metric corresponding to particular host devices, processes, services, users, event types, and so forth. The risk metric may be a numeric metric of any range (e.g., a metric ranging from 0 to 10, with a higher number corresponding to a higher security risk). The risk metric may also be descriptive and may include any number of risk categories (e.g., high, medium, or low risk).

A pair of vertices in the graph may be connected by any number of edges corresponding to any number of events. In some implementations, the graph may include one or more overlay edges that summarize the events of a particular type involving one or more pairs of entities. For example, a graph may include first and second vertices corresponding to first and second host devices, and the vertices may be connected by ten edges corresponding to ten different network connections created between the host devices at different times. The graph may then be modified to include an overlay edge between the vertices, the overlay edge summarizing the ten network connections between the host devices. Each overlay edge may correspond to a particular type of event, and may include a rarity metric indicating a rarity or a frequency of events of that type that have occurred between the entities. The overlay edge(s) may be incorporated into the graph as an additional edge, in addition to the plurality of edges corresponding to particular events. Alternatively, in some implementations the rarity metric may be included as an attribute in the edges corresponding to particular events.

In some implementations, the graph may be traversed to identify anomalous activity data included in the graph. Starting from a start vertex, the graph may be traversed along at least a portion of the edges in the graph to identify those edges that include a rarity metric that satisfies a predetermined rarity threshold and that include a risk metric that satisfies a predetermined risk threshold. The traversal may be depth-first such that each traversed branch of the graph is traversed as far as possible before returning to a previous branch. Alternatively, the traversal may be breadth-first such that neighboring nodes are explored prior to exploring deeper along a possible branch. The traversal may identify a subset of edges that satisfy one or both of a risk threshold and a rarity threshold. The subset of edges, and the vertices connected by the edges, may be stored as anomalous activity data for further analysis.

In some cases, a malicious intrusion or attack may gain access to an initial point of compromise in a computing environment, and that initial point of compromise may not immediately lead to an exploit such as an acquisition of sensitive data. Instead, an attacker may seek to leverage the initial point of compromise to gain access to other host devices, processes, services, or stored data that enables further access along a chain of multiple accesses. For example, an exploit by a particular attacker may begin when a user opens a malicious attachment in an email. Through the attachment the attacker may gain access to a host device, and subsequently use that initial access to gain further access to a system resource such as stored data or a process. Such further access may then be leveraged to acquire credentials enabling additional access to system resources. In this way, an attacker may explore a computing environment to learn information about the environment such as its network topology, the systems, processes, services, or other software modules present in the environment, or the presence and location of potentially valuable targets (e.g., stored data, processes, or host devices). Through this exploration, the attacker's access may spread until it is able to gain access to a potentially valuable target.

In such complex, multi-access attack scenarios, each individual access may resemble a legitimate access by a legitimate user, process, or device, and may therefore not be readily identifiable as a security breach using traditional techniques. However, the malicious exploration of a computing environment may, in some cases, appear to be more random and less directed than the activities of a legitimate user or process that may perform particular operations with greater frequency. For example, an attacker may tend to explore a host device more widely than a legitimate user or process, accessing web browser caches, emails, or other data storage rarely accessed by a legitimate user or process. By correlating event data in a graph, and traversing the graph according to risk and rarity of events, implementations may enable the detection of an attack that involves a complex chain of accesses in a computing environment.

FIG. 1 depicts an environment 100 including one or more host devices 102. The host device(s) 102 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. In some cases, two or more of the host devices 102 may comprise a cluster, cloud, farm, or other grouping of multiple devices that coordinate operations to provide load balancing, failover support, parallel processing capabilities, shared storage resources, or other aspects. Although examples herein may describe the host device(s) 102 as physically separate devices, implementations are not so limited. In some cases, the host device(s) 102 may include one or more of a virtual computing environment, a hypervisor, a device emulation, or a virtual machine executing on one or more physical computing devices. The host device(s) 102 are described further with reference to FIG. 8.

Each of the host device(s) 102 may execute one or more processes 104, one or more services 106, or both process(es) 104 and service(s) 106. The process(es) 104 may include instances of software modules such as computer programs, applications, or libraries executing in memory on the host device(s) 102. The process(es) 104 may include any type of background or foreground process, including but not limited to: user applications with a graphical user interface (GUI) or command-line user interface (CUI); processes that are components of an operating system (OS); daemons of any type, such as the masterd daemon, Local Security Authority (LSA) daemon, and so forth; privileged system processes or services; and so forth. The process(es) 104 may include any number of threads, and may include both child processes (e.g., processes launched by other processes) and parent processes (e.g., processes that launch other processes).

A service 106 may provide a capability on the host device 102 where it executes, the capability being to receive, transmit, store, retrieve, or manipulate data. A service 106 may include any number of process(es) 104 configured to operate cooperatively to provide the capability. In some cases, a service 106 may be distributed among a plurality of host devices 102, e.g., with different modules or components of the service 106 executing on different host devices 102. In such cases, the logs that store information regarding the operations of the service 106 may not identify a particular host device 102 where the service 106 is executing.

In some implementations, the host device(s) 102 may include an event detection module 108 that is configured to collect event data 110 describing one or more events that occur on the host device(s) 102. The event detection module 108 may access various sources of information to identify events that have occurred on the host device 102, or to identify events associated with interactions between host devices 102. Such sources of information may include but are not limited to: log files produced by OS components; log files produced by user applications; log files produced by networking components; log files produced by security-related components; log files generated by security related sensors associated with secure email processing, malware detection, security web proxies, and so forth; log files produced by communications-related applications such as email and messaging applications; log files produced by other processes 104 or services 106; registry information; and so forth. The event detection module 108 may be configured to read and analyze the various sources of information stored in any format. Although the event detection module 108 is depicted as executing on the host device(s) 102, in some implementations the event detection module 108 may execute on other devices. In such cases, the event detection module 108 may be configured to remotely access information stored on the host device(s) 102 to generate the event data 110.

The event data 110 collected from the various host devices 102 may be stored on one or more event data storage systems 112 that are accessible to the host device(s) 102 over a network. The event data storage system(s) 112 may include any number of datastores, databases, or other types of data storage systems that support any type of data storage format. In some cases, the event data storage system(s) 112 may employ a relational data storage format including one or more formally described tables, each table including one or more columns associated with data attributes. In such cases, the event data storage system(s) 112 may be managed through any type of relational database management system (RDBMS) software. The event data storage system(s) 112 may also include any number of non-relational datastores that employ a non-relational data storage. Such non-relational datastores may employ a hierarchical database model, or a network database model. The non-relational datastores may also include key-value datastores, hash tables, flat files, associative arrays, other types of data structures, or unstructured data storage.

Figure 2:
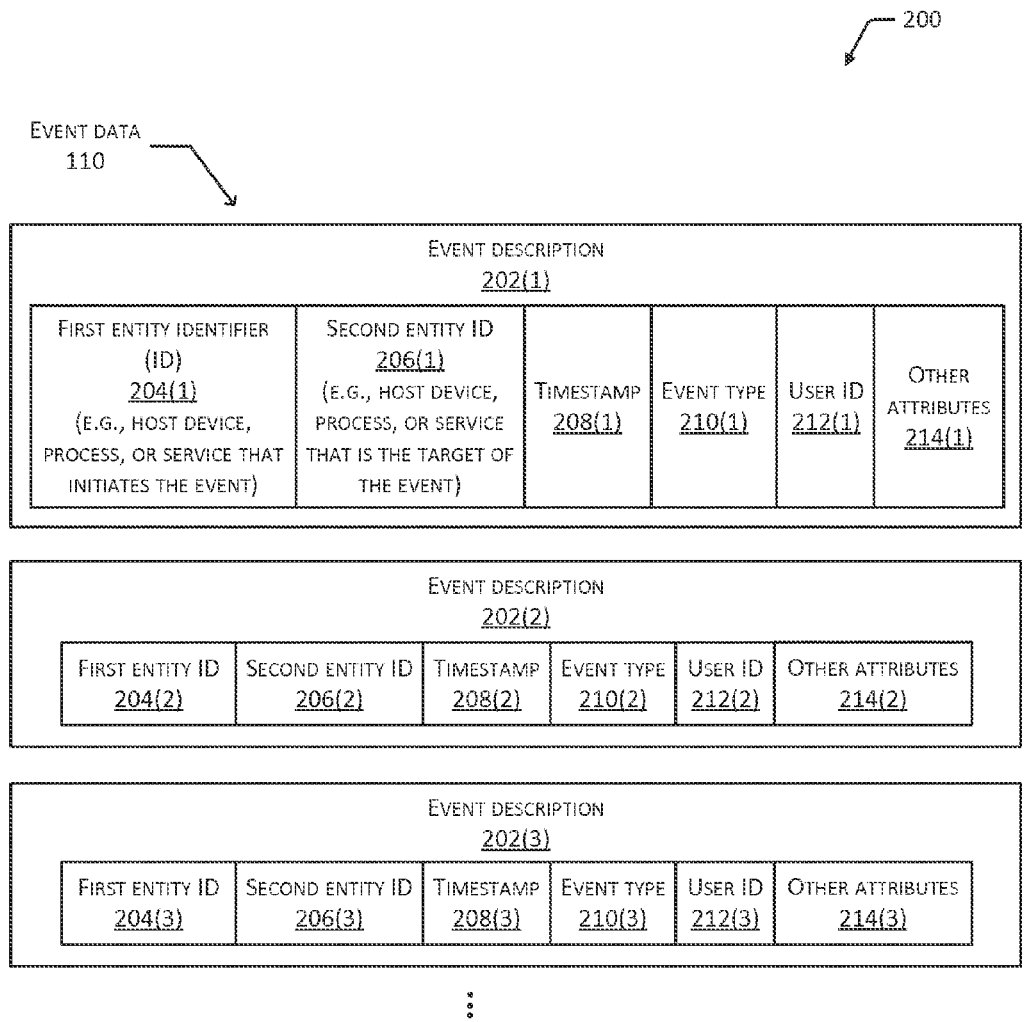
FIG. 2 depicts a schematic illustrating an example format for event data that may be employed in generating graph(s).

Implementations support the use of any format for describing the event data 110. FIG. 2 depicts a schematic 200 illustrating an example format for the event data 110. As shown in FIG. 2, the event data 110 may include an event description 202 for each of any number of events. The event description 202 may include a first entity identifier (ID) 204 identifying the entity, e.g., host device 102, process 104, or service 106, that initiates the event. The event description 202 may include a second entity ID 206 identifying the entity, e.g., host device 102, process 104, or service 106, that receives the event, is the destination of the event, or is the target of the event.

Implementations support the use of any type of ID for the first entity ID 204 and the second entity ID 206. For example, in cases where the identified entity is a host device 102, an entity ID may be a local hostname or a local domain name. The entity ID may also be a fully qualified domain name (FQDN) that provides a fully qualified location of the host device 102 in a domain name system, including a top-level domain and a root zone. As such, the entity ID may be a Uniform Resource Identifier (URI) of the host device 102, such as a Uniform Resource Locator (URL) or a Uniform Resource Name (URN). The entity ID may also include an Internet Protocol (IP) address or Media Access Control (MAC) address of the host device 102, or any other information that uniquely identifies the host device 102 among a plurality of host devices 102. In cases where the identified entity is a process 104, an entity ID may be a name and location (e.g., fully qualified directory and/or file path) of the executable software module of the process 104, and may include an identification of the host device 102 where the process 104 executes. In cases where the identified entity is a service 106, an entity ID may be a name of the service 106, and may include an identification of the host device 102 that provides the service 106. The first entity ID 204 and the second entity ID 206 may identify different entities, or may identify a same entity. For example, an event may include a call from a host device 102 to the same host device 102 to call a service 106 or a process 104 executing on the host device 102.

The event description 202 may include a timestamp 208 indicating a date, a time, or both a date and time when the event occurred. The timestamp 208 may be described in any format. The event description 202 may also include an event type 210 that indicates a type, category, or class of event. Implementations support the graph based analysis of events of any event type 210, including but not limited to the following examples.

The event type 210 may be a network connection initiated by a first entity and a second entity. For example, a first host device 102 may initiate a network connection with a second host device 102. The event type 210 may also be a communication over a network connection. The network connection may be according to a networking protocol at any level of the Open Systems Interconnection (OSI) model. For example, the network connection may be according to a version of the Transmission Control Protocol (TCP) or IP. The network connection may be unsecured, or may be secured according to a cryptographic protocol such as a version of the Secure Sockets Layer (SSL) or Transport Layer Security (TLS) protocol. The event type 210 may include an identification of the particular communication protocol employed in the network connection, and may also include an indication of whether the network connection is secured or unsecured. The event type 210 may also indicate whether the network connection employed particular credentials, such as a login/password, public key, private key, digital certificate, authentication token, and so forth.

The event type 210 may be a login to a second entity, e.g., a service 106 or a host device 102, from a first entity. In such cases, the event type 210 may include additional information regarding the login, such as whether the login employed username and password credentials, a token, a digital certificate, and so forth.

The event type 210 may be an access to a resource on a second entity, e.g., a host device 102, from a first entity. For example, the event type 210 may indicate access to a file, database, or registry in memory on a host device 102. In such cases, the event type 210 may indicate a type of resource accessed, such as a file, database, or registry. Alternatively, the event type 210 may identify a particular resource accessed, such as a fully qualified file name and directory path, a particular registry key, or a particular database table, column, and so forth. The access to a resource may include adding, deleting, copying, modifying, or communicating the resource. For example, a file may be accessed to read the file, edit the file, delete the file, modify the file's access permissions, or communicate the file to a remote computing device, process, or user. The event type 210 may also be an access to a resource that is a service 106 provided by the second entity, such as an email service, a messaging service, and so forth.

The event type 210 may be an access by a first entity to a process 104 executing, or executable, on a host device 102. Such access may be to start the process 104, terminate the process 104, suspend the process 104, change the priority of the executing process 104, or access the memory of an executing process 104 (e.g., to inject code, to extract sensitive information, and so forth). The event type 210 may identify the particular process 104 accessed, and may also identify the operations performed regarding the process 104 (e.g., to start, terminate, suspend, or reprioritize the process 104).

The event type 210 may also indicate a presence or absence of a file on a host device 102 in the environment 100. For example, a hashing algorithm or other technique may be employed to track a list of files currently present on one or more host devices 102, and an event may occur if a new file (e.g., a binary executable file) is present or a previously present file is no longer present. Implementations also support other event types 210 included in the event description(s) 202. Presence of files for first time in environment; hash on binary, etc.

The event description 202 may also include a user ID 212 that identifies one or more particular users associated with the event. For example, in cases where the event type 210 is a network connection or a login to a service 106, the user ID 212 may identify the user credentials employed to establish the network connection or to login to the service 106. In some implementations, the event description 202 may include other attributes 214 regarding the event, such as a file name or location of a file accessed during the event, a name of a process 104 accessed during the event, and so forth.

Figure 3:
FIG. 3 depicts a schematic illustrating an example of event data that may be employed in generating graph(s).

FIG. 3 depicts a schematic 300 illustrating an example of the event data 110. As shown in the example, the event data 110 may include any number of records, rows, or data elements that each correspond to an event. Although the example of FIG. 3 depicts the event data 110 described using a markup language such as a version of the Extensible Markup Language (XML), implementations are not so limited. Implementations support the use of any format to describe the event data 110, including formats to employ or do not employ metadata tags to identify particular data elements. In the example of FIG. 3, each event is described in a tag, and the first entity ID 204, the second entity ID 206, the timestamp 208, the event type 210, and the user ID 212 are included as attributes in the tag. Alternatively, one or more of the first entity ID 204, the second entity ID 206, the timestamp 208, the event type 210, or the user ID 212 may be incorporated as a separate tag between open and close tags such as an <event> tag and a </event> tag. In some implementations, the event data 110 may be formatted according to a version of the JavaScript Object Notation (JSON) format originally specified by Douglas Crockford.

With reference to FIG. 1, the environment 100 may include one or more analysis devices 114. The analysis device(s) 114 may comprise any type of computing device, including but not limited to the types of computing devices described with reference to the host device(s) 102. In some cases, two or more of the analysis devices 114 may comprise a cluster, cloud, farm, or other grouping of multiple devices that coordinate operations to provide load balancing, failover support, parallel processing capabilities, shared storage resources, or other aspects. Although examples herein may describe the analysis device(s) 114 as physically separate devices, implementations are not so limited. In some cases, the analysis device(s) 114 may include one or more of a virtual computing environment, a hypervisor, a device emulation, or a virtual machine executing on one or more physical computing devices. The analysis device(s) 114 are described further with reference to FIG. 9.

The analysis device(s) 114 may execute a graph generation module 116 configured to access the event data 110 and generate one or more graphs 118 that graphically correlate or otherwise describe at least some of the events included in the event data 110. Generation of the graph(s) 118 is described further with reference to FIGS. 4, 5, and 10.

Figure 4:
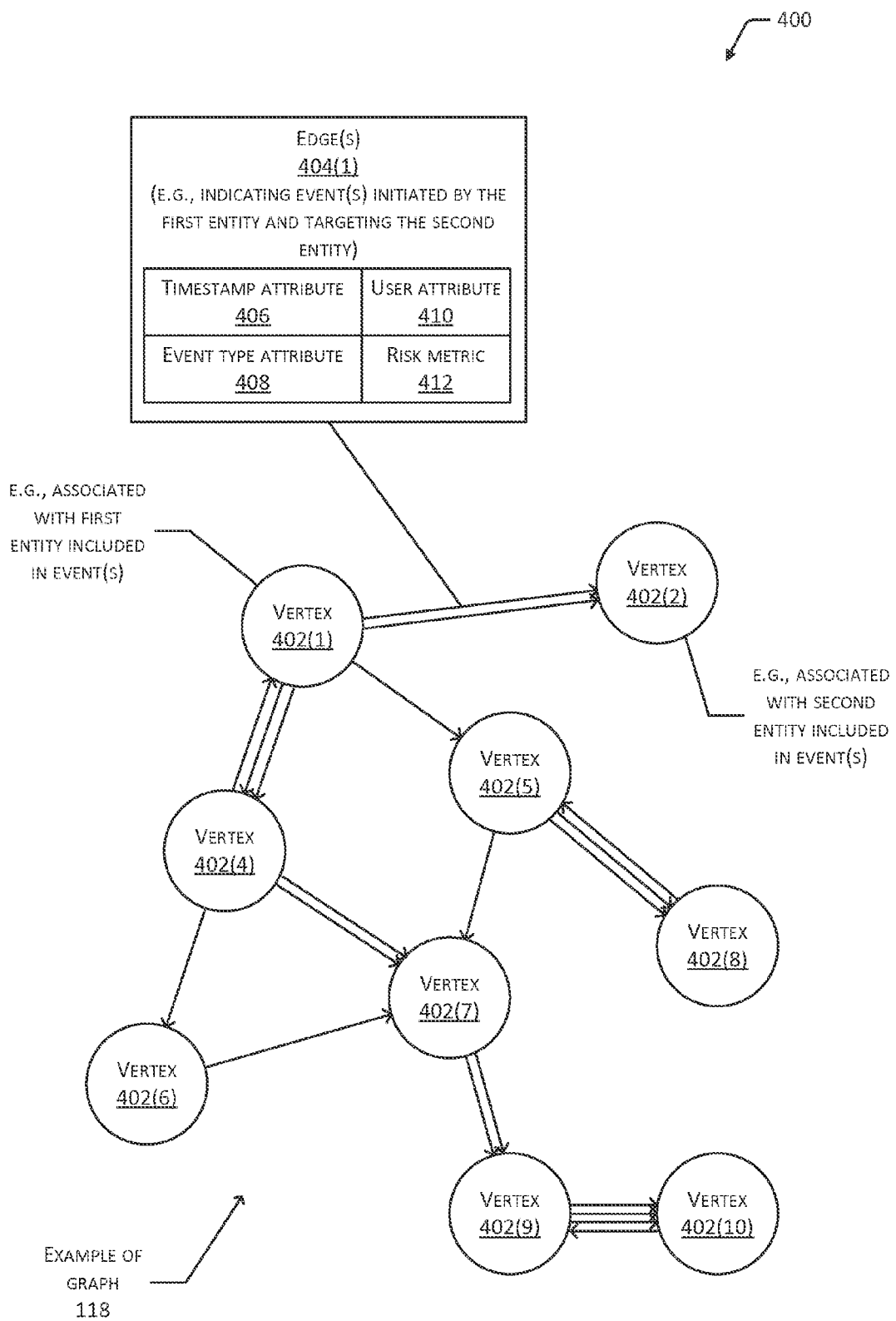
FIG. 4 depicts a schematic illustrating an example graph as an arrangement of event data, including vertices corresponding to entities such as devices, processes, or services in a computing environment, and including edges corresponding to events in which one entity accesses another entity.

FIG. 4 depicts a schematic 400 illustrating an example graph 118 as an arrangement of events. As shown in FIG. 4, the graph 118 may include vertices 402 each corresponding to an entity such as a host device 102, a process 104, or a service 106. Each vertex 402 may include an identification of the corresponding entity, such as the first entity ID 204 or the second entity ID 206. The graph 118 may also include one or more edges 404. The graph 118 may include two types of edges 404. The graph 118 may include edge(s) 404(1) that each correspond to a particular event. The graph 118 may also include edge(s) 404(2) (e.g., overlay edge(s)) that each summarize the event(s) of a particular type connecting a pair of vertices 402.

As shown in FIG. 4, the graph 118 may include, between each pair of vertices 402, any number of edge(s) 404(1) connecting the pair of vertices 402. Because each edge 404(1) corresponds to an event, multiple edges 404(1) connecting a pair of vertices 402 indicates that multiple events have occurred that involve the pair of vertices 402. For example, a pair of vertices 402 may correspond to two host devices 102, and multiple edges 404(1) connecting the pair of vertices 402 may indicate that multiple network connections have been established between the two host devices 102 at various times. Each edge 404(1) may include a directionality that indicates which entity initiates the event and which entity is targeted by the event. In this way, the graph 118 may be a directed graph. For example, the directional edge 404(1), depicted as an arrow, connecting the vertices 402(1) and 402(2) may indicate that the first entity corresponding to the vertex 402(1) established a network connection with the second entity corresponding to the vertex 402(2). A pair of vertices 402 may be connected by any number of edges 404(1), each edge 404(1) exhibiting any directionality.

Each edge 404(1) may include various attributes that describe the edge 404(1). The edge 404(1) may include a timestamp attribute 406 describing the timestamp 208 of the associated event. The edge 404(1) may include an event type attribute 408 describing the event type 210 of the associated event. In some cases, the edge 404(1) may include a user attribute 410 describing the user ID 212 of the associated event.

One or more edges 404(1) may also include a risk metric 412. The risk metric 412 of an edge 404(1) may indicate a security risk of the event that is associated with the edge 404(1), or that is associated with the entities corresponding to the vertices 402 connected by the edge 404(1). The risk metric 412 of an edge 404(1) may be based on a potential impact or access capability of the associated event. For example, an edge 404(1) corresponding to a network connection may include a higher risk metric 412 for a secured network connection (e.g., secured using a cryptographic method, a certificate, or otherwise) than for an unsecured (e.g., unencrypted) network connection, given that a secured network connection may enable access to more sensitive host devices, services, or stored information. As another example, the risk metric 412 may be high if the user attribute 410 identifies a user with wide access privileges in a particular host device 102 or in a computing environment, such as a root or administrative user, given that such a user may have access to more sensitive data or systems. Further, a risk metric 412 may be high for an event in which a user's privileges are expanded to enable wider access, such as through administrative or root privileges.

In some cases, the risk metric 412 may be high if the associated event accesses a host device 102, a process 104, or a service 106 that enables access to sensitive, confidential, or private information, or if the associated event accesses information that enables such access. For example, an edge 404(1) corresponding to an event that includes a file or database access may include a high risk metric 412 if the accessed information is confidential, sensitive, private, or enables subsequent accesses to such information. As another example, a high risk metric 412 may be assigned for an event that is an access to a password file.

In some implementations, the risk metric 412 for an edge 404(1) may be determined by accessing security risk data which lists a risk metric 412 for one or more particular host devices 102, processes 104, services 106, user IDs 212, event types 210, and so forth. The risk metric 412 may be numeric spanning any range. For example, the risk metric 412 may range from 0 to 10, with a higher number corresponding to a higher security risk for an entity or an attribute of an event. Alternatively, the risk metric 412 may be descriptive and may include any number of risk categories. For example, the risk metric 412 may indicate a high, medium, or low risk.

Figure 5:
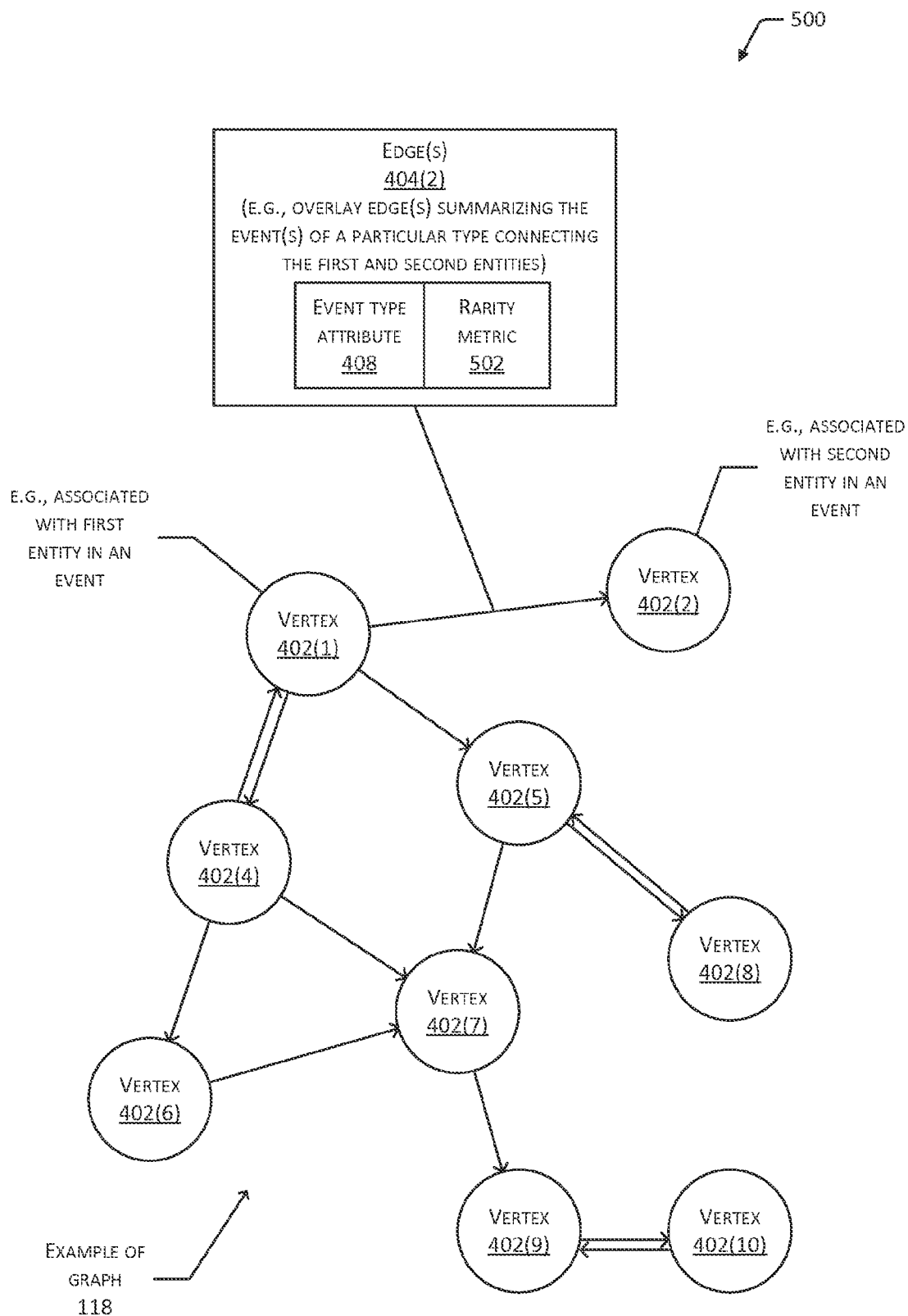
FIG. 5 depicts a schematic illustrating an example graph as an arrangement of event data, including overlay edge(s) that summarize the event(s) of a particular type connecting pairs of entities, the overlay edge(s) including a rarity metric indicating a rarity or frequency of the event(s) of the particular type.

After generating a first version of the graph 118 for a particular set of event data 110 (e.g., as shown in FIG. 4), the graph generation module 116 may analyze the graph 118 to determine one or more overlay edges 404(2) to be incorporated into the graph 118. FIG. 5 depicts a schematic 500 illustrating an example graph 118 including one or more overlay edges 404(2) between each pair of vertices 402. An overlay edge 404(2) between a pair of vertices 402 may summarize the edges 404(1) that include a particular event type attribute 408 and that connect the pair of vertices 402. Accordingly, the overlay edge 404(2) may include the event type attribute 408 indicating the event type 210 summarized by the overlay edge 404(2). In some cases, the overlay edge 404(2) between a pair of vertices 402 may summarize the edges 404(1) between those vertices 402 that include a particular event type attribute 408 as well as any number of other attributes, such as a particular user attribute 410. A pair of vertices 402 may be connected by any number of overlay edge(s) 404(2), with each overlay edge 404(2) summarizing one or more edges 404(1) that include particular attribute values. The overlay edge 404(2) may also include a rarity metric 502, which indicates a rarity or frequency of the event(s) summarized by the overlay edge 404(2).

In the following Example 1, a graph 118 includes four edges 404(1) (e.g., "E") that connect two vertices (e.g., "V1" and "V2") associated with four events involving two entities—a first host device 102 (e.g., "host1") and a second host device 102 (e.g., "host2").

Example 1

V1{entityID=host1}→E{type=ssh, timestamp=1, user=root}→V2{entityID=host2}
V1{entityID=host1}→E{type=ssh, timestamp=2, user=root}→V2{entityID=host2}
V1{entityID=host1}→E{type=ssh, timestamp=3, user=jdoe}→V2{entityID=host2}
V1{entityID=host1}→E{type=ssh, timestamp=4, user=root}→V2{entityID=host2}

In Example 1, each of the events is a network connection established using the Secure Shell' (SSH) cryptographic network protocol originally developed by the SSH Communications Security Corporation' of Helsinki, Finland. Accordingly, the event type attribute 408 for each edge 404(1) is "ssh". In Example 1, each of the four events occurred at a different time, and therefore the edge(s) 404(1) include different timestamp attributes 406. Three of the edge(s) 404(1) include a user attribute 410 "root", and one edge 404(1) includes a different user attribute 410 "jdoe", corresponding to the users whose credentials were employed in the SSH connections. In some implementations, the rarity metric 502 of an overlay edge 404(2) may be calculated according to Formula 1.

$$\text{Rarity} = \frac{1}{1 + \log_2 |V1, \{E \mid \text{exclude timestamp}\}, V2|} \quad \text{Formula 1}$$

As shown in Formula 1, the rarity metric 502 may be calculated based on a count of the number of edges 404(1) connecting two vertices 402, the count indicated by the notation |V1, {E|exclude timestamp}, V2|. In some implementations, the count may exclude the timestamp attribute 406, such that edges 404(1) including the same event type attribute 408 but different timestamp attributes 406 may be included in the same count. The count may be further based on the number of edges 404(1) that include the same event type attribute 408 and the same value of one or more other attributes, such as the user attribute 410. Implementations may employ Formula 1 to calculate the rarity metric 502 in a range from 0 to 1, with 0 corresponding to the lowest rarity (e.g., a large number of edge(s) 404(1)) and 1 corresponding to the highest rarity (e.g., a single edge 404(1)). As in the example of Formula 1, implementations may calculate the rarity metric 502 using a formula that employs a logarithmic operation (e.g., $\log_2$). Implementations may employ other formulae to calculate the rarity metric 502. By applying Formula 1 to the edges 404(1) listed in Example 1, two overlay edges 404(2) may be determined to be added to the graph 118 as listed in Example 2 below.

Example 2

V1{entityID=host1}→E{type=ssh, user=root, rarity=0.3869}→V2{entityID=host2}

V1{entityID=host1}→E{type=ssh, user=jdoe, rarity=1}→V2{entityID=host2}

Although FIG. 5 depicts the overlay edge(s) 404(2) as separate from the event-associated edge(s) 404(1) shown in FIG. 4, in some implementations both types of edges 404 may be included in the same graph 118 with the overlay edge(s) 404(2) incorporated into the graph 118 to provide additional rarity or frequency information regarding the event-associated edge(s) 404(1). Alternatively, in some implementations the rarity metric 502 may be incorporated as an additional attribute into each of the event-associated edge(s) 404(1).

Returning to FIG. 1, the graph(s) 118 generated by the graph generation module 116 may be stored in memory on the analysis device(s) 114, or elsewhere, and made available to a graph analysis module 120 executing on the analysis device(s) 114. The graph analysis module 120 may traverse a graph 118 along at least a portion of the edges 404 included in the graph 118. During the traversal, a subset of the edges 404 and the vertices 402 may be identified for which the risk metric 412 satisfies a predetermined risk threshold, and for which the rarity metric 502 satisfies a predetermined rarity threshold. In some implementations, both the risk metric 412 and the rarity metric 502 may be employed to select a subset of the edges 404 and vertices 402. Alternatively, one of the risk metric 412 or the rarity metric 502 may be so employed. The traversal of the graph 118 to identify a subset of the graph 118 based on one or both of the risk metric 412 and the rarity metric 502 is described further with reference to FIGS. 6, 7, and 11.

In implementations where the rarity threshold or the risk threshold comprises a lower bound criterion for selecting an edge 404, the rarity threshold or the risk threshold may be satisfied if the rarity metric 502 or the risk metric 412 meets or surpasses its respective threshold. Alternatively, in implementations where the rarity threshold or the risk threshold comprises an upper bound criterion for selecting an edge 404, the rarity threshold or the risk threshold may be satisfied if the rarity metric 502 or the risk metric 412 meets or is below its respectively threshold. Implementations support the use of rarity and risk thresholds that constitute lower bound or upper bound criteria for determining whether an edge 404 is to be included in a subset of the graph 118 designated as anomalous activity data 122.

Figure 6:
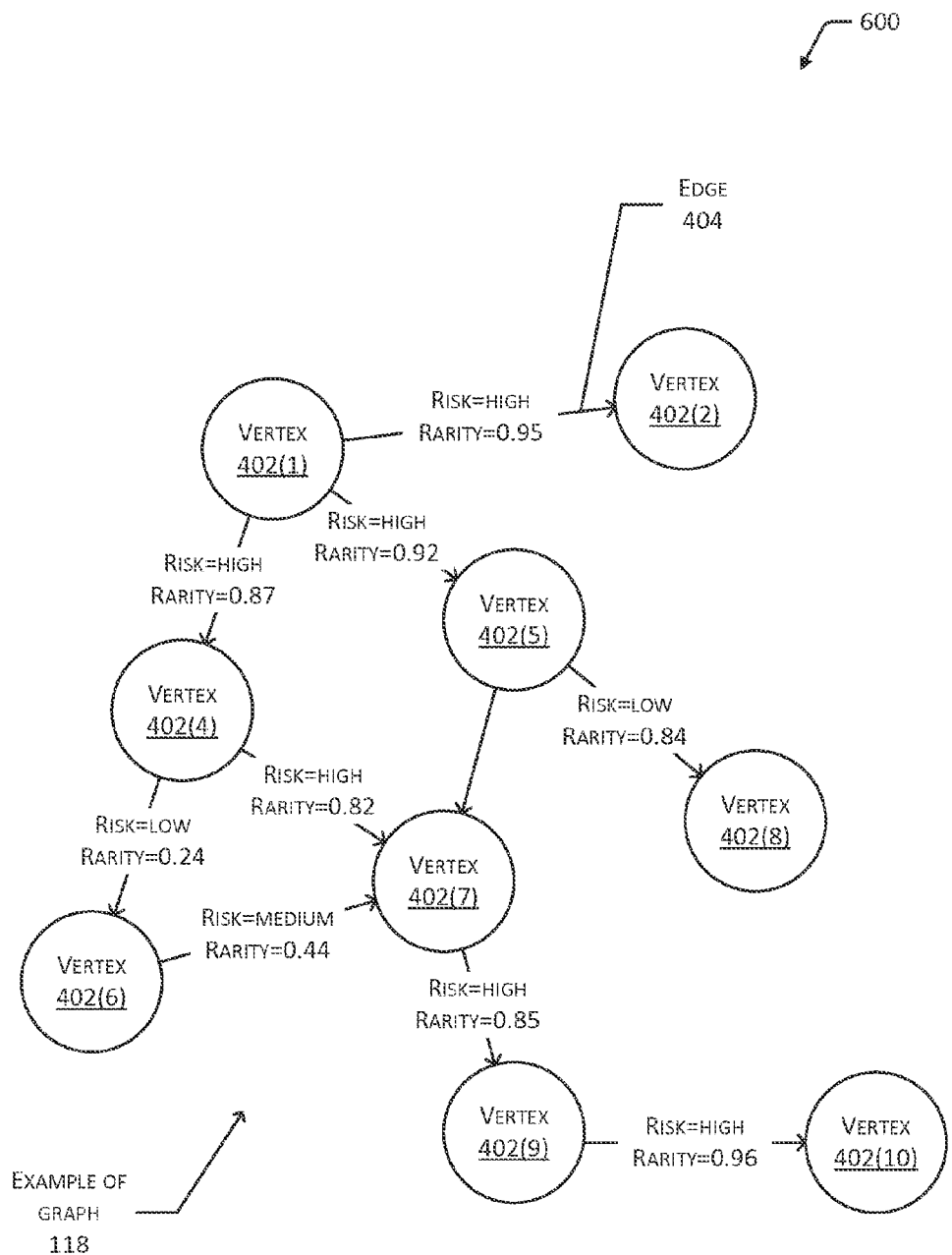
FIG. 6 depicts a schematic illustrating an example graph as an arrangement of event data, with example values of a risk metric and a rarity metric shown for edge(s) in the graph.

FIG. 6 depicts a schematic 600 illustrating an example graph 118, including example values of the risk metric 412 and the rarity metric 502 shown for the edges 404 in the graph 118. For clarity of illustration, FIG. 6 depicts one edge 404 connecting each of various pairs of vertices 402. However, in some implementations as described above a pair of vertices 402 may be connected by any number of edges 404(1) each associated with an event, and any number of overlay edges 404(2) that summarize edge(s) 404(1) that include a particular set of attributes.

Beginning from a starting vertex 402, the graph 118 may be traversed along the edges 404 for which the rarity metric 502 satisfies a rarity threshold and the risk metric 412 satisfies a risk threshold. The traversal may be performed based on the timestamp attribute 406, such that the traversal is forward in time. For example, after following an edge 404 to reach a vertex 402, the next outgoing edge 404 followed (e.g., an edge 404 leaving the vertex 402) may have a timestamp attribute 406 with a value greater than the timestamp attribute 406 of the incoming edge 404. In this way, implementations may avoid graph traversals which loop back on themselves.

Figure 7:
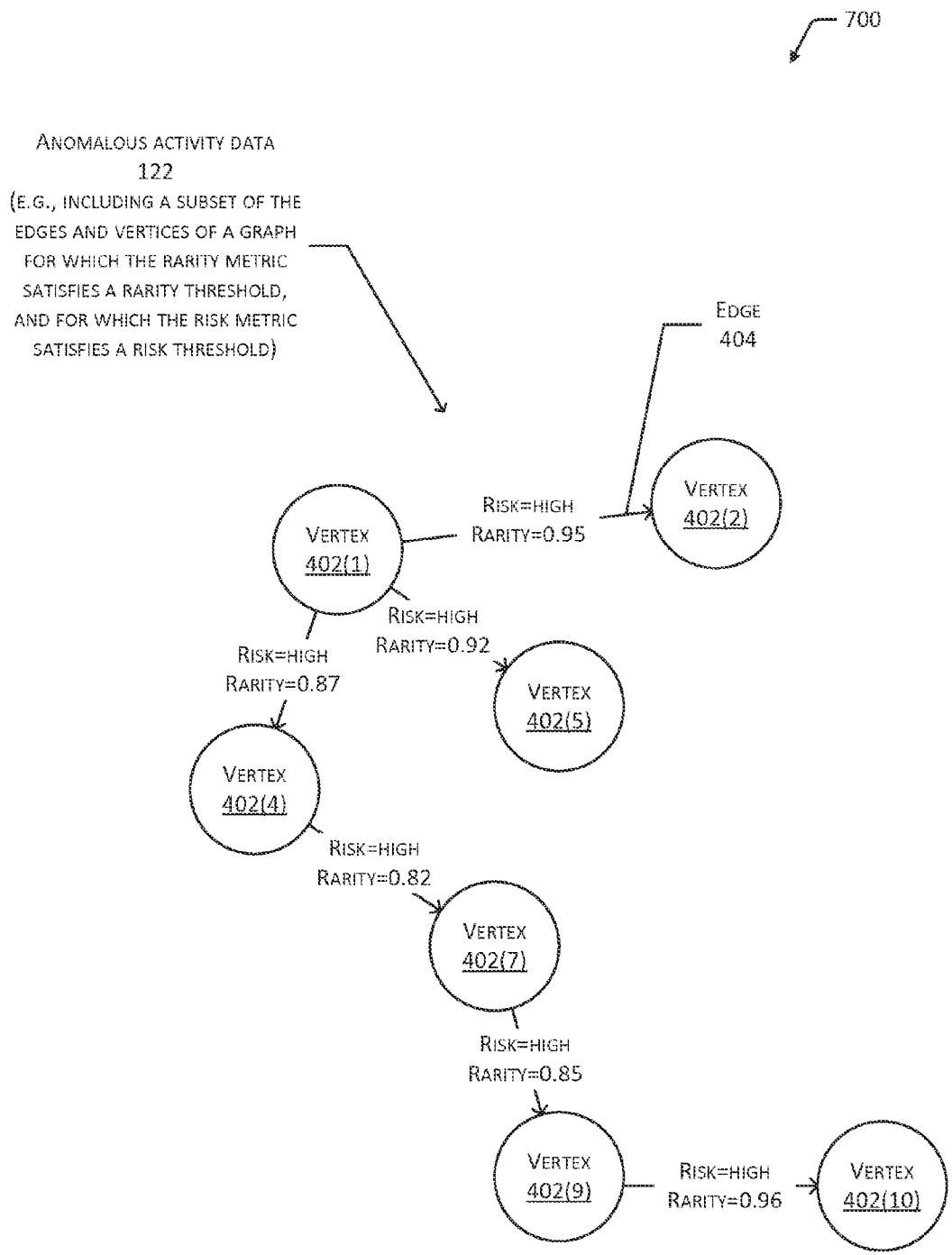
FIG. 7 depicts a schematic illustrating a subset of an example graph, the subset including one or more edges and two or more vertices for which the rarity metric and the risk metric satisfy a threshold, such that the subset represents anomalous activity and a potential security risk within a computing environment.

FIG. 7 depicts a schematic 700 illustrating a subset of the example graph 118 shown in FIG. 6, the subset determined based on a traversal of the example graph 118 shown in FIG. 6. In the example of FIG. 7, the traversal has selected those edges 404 for which the rarity metric 502 satisfies and is at least a rarity threshold of 0.8, and for which the risk metric 412 satisfies a risk threshold of "high". Implementations support a depth-first traversal or a breadth-first traversal. In some implementations, the traversal along a particular path of the graph 118 may cease on reaching an edge 404 that does not satisfy the threshold criteria for the risk metric 412 and the rarity metric 502. Accordingly, an edge 404 that satisfies the criteria may not be reached if it is accessible via other edge(s) 404 that do not satisfy the criteria.

Returning to FIG. 1, the subset of the graph 118 determined by traversing the graph 118 may be described in anomalous activity data 122. The anomalous activity data 122 may be stored in memory on the analysis device(s) 114, or elsewhere, and made available for further analysis. In some cases, the anomalous activity data 122 may be accessed and examined by system administrators, security analysts, system developers, or other personnel to determine whether the events included in the anomalous activity data 122 indicate an attack, exploit, or other form of security breach. In such cases, the anomalous activity data 122 may be presented in a graphical form (e.g., as the subset of the graph 118) to facilitate analysis. In some cases, the anomalous activity data 122 may be graphically presented as an overlay to the full graph 118 or as an overlay to a surrounding or nearby region of the graph 118 to facilitate analysis. In some cases, the anomalous activity data 122 may include a description of one or more events as tuples of vertex-edge-vertex, including the first entity ID 204 and the second entity ID 206 associated with the vertices 402. The tuples may also include various attributes of the edge 404, including but not limited to the timestamp attribute 406, the event type attribute 408, the user attribute 410, the risk metric 412, or the rarity metric 502.

In some implementations, one or more additional criteria may be employed to determine whether the edges 404 or vertices 402 are to be included in the subset of the graph 118 designated as the anomalous activity data 122. In some cases, an edge 404 having a particular value for an attribute, such as a particular user identified in the user attribute 410, may be included in the anomalous activity data 122 regardless of whether it satisfies the rarity threshold or the risk threshold. In some cases, an edge 404 may be included in the anomalous activity data 122 if it connects a vertex 402 that is associated with a particular host device 102 or other entity. For example, a host device 102, process 104, or service 106 may be configured as a honey pot in the environment 100. The honey pot may be accessible to other (e.g., malicious) entities in the environment 100, but authorized entities may have no reason to interact with the honey pot. Accordingly, any interaction with the honey pot entity may be flagged as potentially malicious, and included in the anomalous activity data 122 for further investigation.

In some implementations, automated risk mitigation operations may be performed based on the anomalous activity data 122. Such risk mitigation operations may include quarantining one or more host devices 102 involved in the events of the anomalous activity data 122, to isolate such host devices 102 from the network and mitigate further potential security breaches. Risk mitigation operations may also include terminating or suspending processes 104 or services 106 included in the anomalous activity data 122.

Although the event data storage system(s) 112 are depicted as external to the analysis device(s) 114, in some implementations the event data storage system(s) 112 may be at least partly incorporated into the analysis device(s) 114. Further, although FIG. 1 depicts the graph generation module 116 and the graph analysis module 120 as executing on a same set of one or more analysis device(s) 114, in some implementations the graph generation module 116 and the graph analysis module 120 may execute on different analysis devices 114. Moreover, although FIG. 1 depicts the graph generation module 116 and the graph analysis module 120 as separate software modules, in some implementations the functions of the graph generation module 116 and the graph analysis module 120 may be performed by a same module.

In some implementations, the environment 100 may include one or more intermediate devices 124. The intermediate device(s) 124 may include any type of computing device such as those listed above with reference to the host device(s) 102 and the analysis device(s) 114. In some cases, the intermediate device(s) 124 may include network management devices such as routers, hubs, load balancers, gateways, and so forth. The intermediate device(s) 124 may also include security monitoring devices configured to monitor email services, messaging services, calls between processes 104 or services 106, or other types of network communications. The intermediate device(s) 124 may be separate from the host device(s) 102 and may monitor communications between the host devices 102. In such cases, the intermediate device(s) 124 may be configured to generate log files or other types of information included in the event data 110 that is stored on the event data storage system(s) 112 and that is employed by the graph generation module 116 to generate the graph(s) 118.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, ciphers, digital certificates, or other credentials supported by a security protocol such as any version of the SSL or the TLS protocol.

Figure 8:
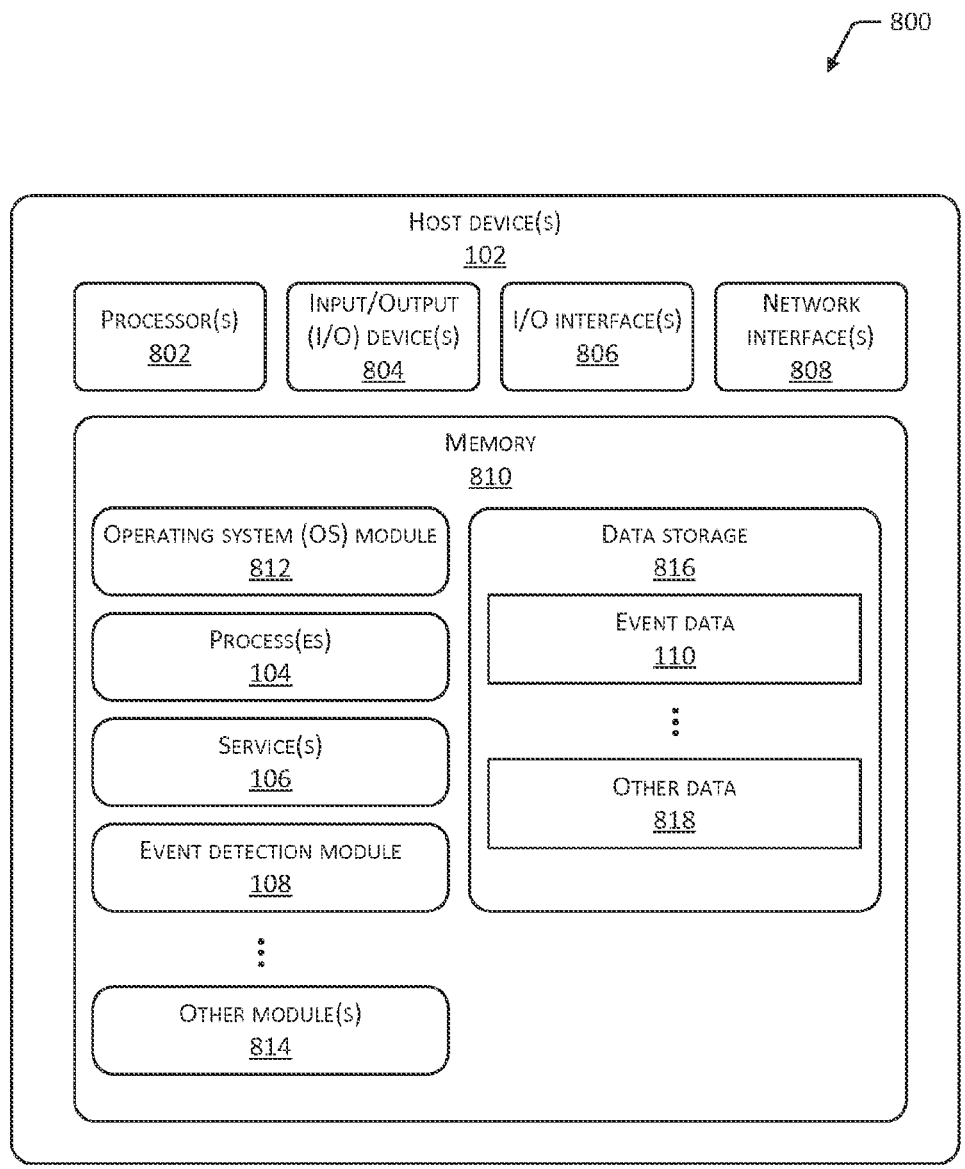
FIG. 8 depicts a block diagram of example host device(s) on which event data may be collected.

FIG. 8 depicts a block diagram 800 of an example of the host device(s) 102. As shown in the block diagram 800, the host device(s) 102 may include one or more processors 802 (e.g., hardware-based processor(s)) configured to execute one or more stored instructions. The processor(s) 802 may comprise one or more cores.

The host device(s) 102 may include one or more input/output (I/O) devices 804. The I/O device(s) 804 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 804 may also include output devices such as a display, an audio output device (e.g., a speaker), a printer, a haptic output device, and so forth. The I/O device(s) 804 may be physically incorporated with the host device(s) 102, or may be externally placed.

The host device(s) 102 may include one or more I/O interfaces 806 to enable components or modules of the host device(s) 102 to control, interface with, or otherwise communicate with the I/O device(s) 804. The I/O interface(s) 806 may enable information to be transferred in or out of the host device(s) 102, or between components of the host device(s) 102, through serial communication, parallel communication, or other types of communication. For example, the I/O interface(s) 806 may comply with a version of the RS-232 standard for serial ports, or with a version of the Institute of Electrical and Electronics Engineers (IEEE) 1284 standard for parallel ports. As another example, the I/O interface(s) 806 may be configured to provide a connection over Universal Serial Bus (USB) or Ethernet. In some cases, the I/O interface(s) 806 may be configured to provide a serial connection that is compliant with a version of the IEEE 1394 standard. The host device(s) 102 may also include one or more busses or other internal communications hardware or software that allow for the transfer of data between the various modules and components of the host device(s) 102.

The host device(s) 102 may include one or more network interfaces 808 that enable communications between the host device(s) 102 and other network accessible computing devices, such as the event data storage system(s) 112 or the analysis device(s) 114. The network interface(s) 808 may include one or more network interface controllers (NICs) or other types of transceiver devices configured to send and receive communications over a network.

The host device(s) 102 may include one or more memories, described herein as memory 810. The memory 810 comprises one or more computer-readable storage media (CRSM). The CRSM may include one or more of an electronic storage medium, a magnetic storage medium, an optical storage medium, a quantum storage medium, a mechanical computer storage medium, and so forth. The memory 810 provides storage of computer-readable instructions that may describe data structures, program modules, processes, applications, or other data for the operation of the host device(s) 102. In some implementations, the memory 810 may provide storage of computer-readable instructions or other information in a non-transitory format.

The memory 810 may include an operating system (OS) module 812. The OS module 812 may be configured to manage hardware resources such as the I/O device(s) 804, the I/O interface(s) 806, and the network interface(s) 808, and to provide various services to applications, processes, or modules executing on the processor(s) 802. The OS module 812 may include one or more of the following: any version of the Linux™ operating system; any version of iOS™ from Apple™ Corp. of Cupertino, Calif., USA; any version of Windows™ or Windows Mobile™ from Microsoft™ Corp. of Redmond, Wash., USA; any version of Android™ from Google™ Corp. of Mountain View, Calif., USA and its derivatives from various sources; any version of Palm OS™ from Palm Computing™, Inc. of Sunnyvale, Calif., USA and its derivatives from various sources; any version of BlackBerry OS™ from Research In Motion™ Ltd. of Waterloo, Ontario, Canada; any version of VxWorks™ from Wind River Systems™ of Alameda, Calif., USA; or other operating systems.

The memory 810 may include one or more of the modules described above as executing on the host device(s) 102, such as one or more of the process(es) 104, the service(s) 106, or the event detection module 108. The memory 810 may also include one or more other modules 814, such as a user authentication module or an access control module to secure access to the host device(s) 102, and so forth.

The memory 810 may include data storage 816 to store data for operations of the host device(s) 102. The data storage 816 may comprise a database, array, structured list, tree, or other data structure, and may be a relational or a non-relational datastore. The data storage 816 may store data such as that described above, including the event data 110. The data storage 816 may also store other data 818, such as user authentication information or access control data. In some implementations, at least a portion of the information stored in the data storage 816 may be stored externally to the host device(s) 102, on other devices that may communicate with the host device(s) 102 via the I/O interface(s) 806 or via the network interface(s) 808.

Figure 9:
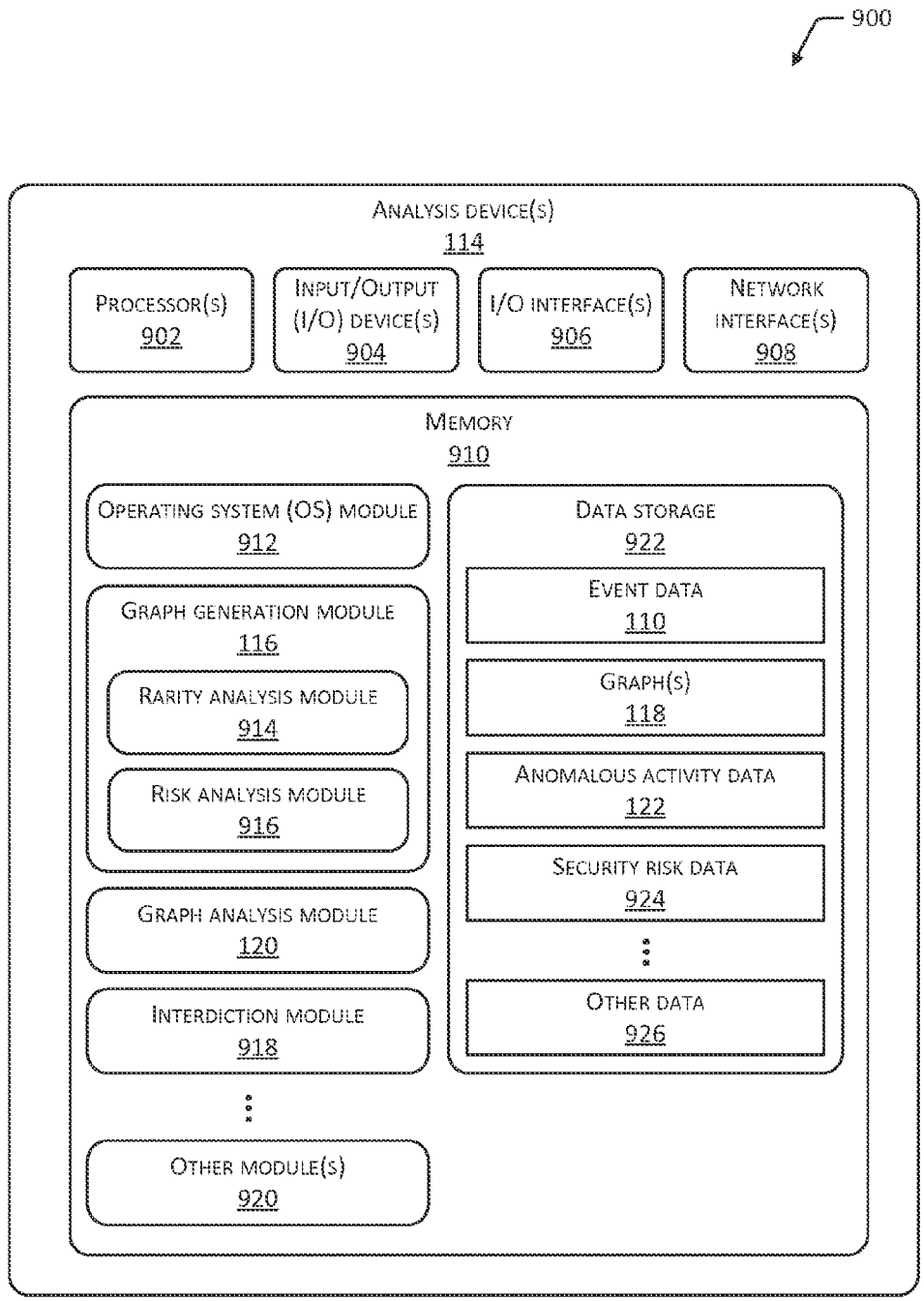
FIG. 9 depicts a block diagram of example analysis device(s) configured to generate graphs that correlate multiple events present in the event data, and to analyze the graph(s) to determine anomalous activity that occurred on the host device(s).

FIG. 9 depicts a block diagram 900 of an example of the analysis device(s) 114. As shown in the block diagram 900, the analysis device(s) 114 may include one or more processors 902 (e.g., hardware-based processor(s)) configured to execute one or more stored instructions. The processor(s) 902 may comprise one or more cores. The analysis device(s) 114 may include one or more I/O devices 904, one or more I/O interfaces 906, and one or more network interfaces 908 as described above respectively with reference to the I/O device(s) 804, the I/O interface(s) 806, and the network interface(s) 808.

The analysis device(s) 114 may include one or more memories, described herein as memory 910. The memory 910 comprises one or more CRSM, as described above with reference to the memory 810. The memory 910 may include an OS module 912 that is configured to manage hardware resources such as the I/O device(s) 904, the I/O interface(s) 906, and the network interface(s) 908, and to provide various services to applications, processes, or modules executing on the processor(s) 902. The OS module 912 may include one or more of the operating systems described above with reference to the OS module 812. The memory 910 may include one or more of the modules described above as executing on the analysis device(s) 114, such as the graph generation module 116 and the graph analysis module 120. In some implementations, graph generation module 116 may include one or both of a rarity analysis module 914 and a risk analysis module 916 to respectively determine the rarity metric 502 and the risk metric 412 for one or more edges 404 of a graph 118. Although FIG. 9 depicts the rarity analysis module 914 and the risk analysis module 916 as sub-modules of the graph generation module 116, in some implementations one or both of the rarity analysis module 914 or the risk analysis module 916 may execute separately from the graph generation module 116.

In some implementations, the memory 910 may include an interdiction module 918 that performs one or more operations to automatically mitigate security risks based on the anomalous activity data 122 determined through analysis of a graph 118. Such operations may include quarantining (e.g., isolating from the network) one or more host devices 102 identified in the anomalous activity data 122. Interdiction operations may also include terminating or suspending processes 104 or services 106 identified in the anomalous activity data 122. In some cases, interdiction operations may include suspending access privileges of user(s) identified in user attribute(s) 410 of edge(s) 404 in the anomalous activity data 122. The memory 910 may also include one or more other modules 920, such as a user authentication module or an access control module to secure access to the analysis device(s) 114, and so forth.

The memory 910 may include data storage 922 to store data for operations of the analysis device(s) 114. The data storage 922 may comprise a database, array, structured list, tree, or other data structure, and may be a relational or a non-relational datastore. The data storage 922 may include data that is in active memory on the analysis device(s) 114, or data that is written to a hard drive, disk, or other non-volatile storage on the analysis device(s) 114. The data storage 922 may store data such as that described above, including one or more of the event data 110, the graph(s) 118, or the anomalous activity data 122. In some implementations, the data storage 922 may store security risk data 924 that may provide a risk metric 412 associated with each of one or more host devices 102, processes 104, services 106, users, or particular data stored on host device(s) 102. The security risk data 924 may be employed by the risk analysis module 916 to determine the risk metric 412 to include in one or more edges 404. The data storage 922 may also store other data 926, such as user authentication information or access control data. In some implementations, at least a portion of the information stored in the data storage 922 may be stored externally to the analysis device(s) 114, on other devices that may communicate with the analysis device(s) 114 via the I/O interface(s) 906 or via the network interface(s) 908.

Figure 10:
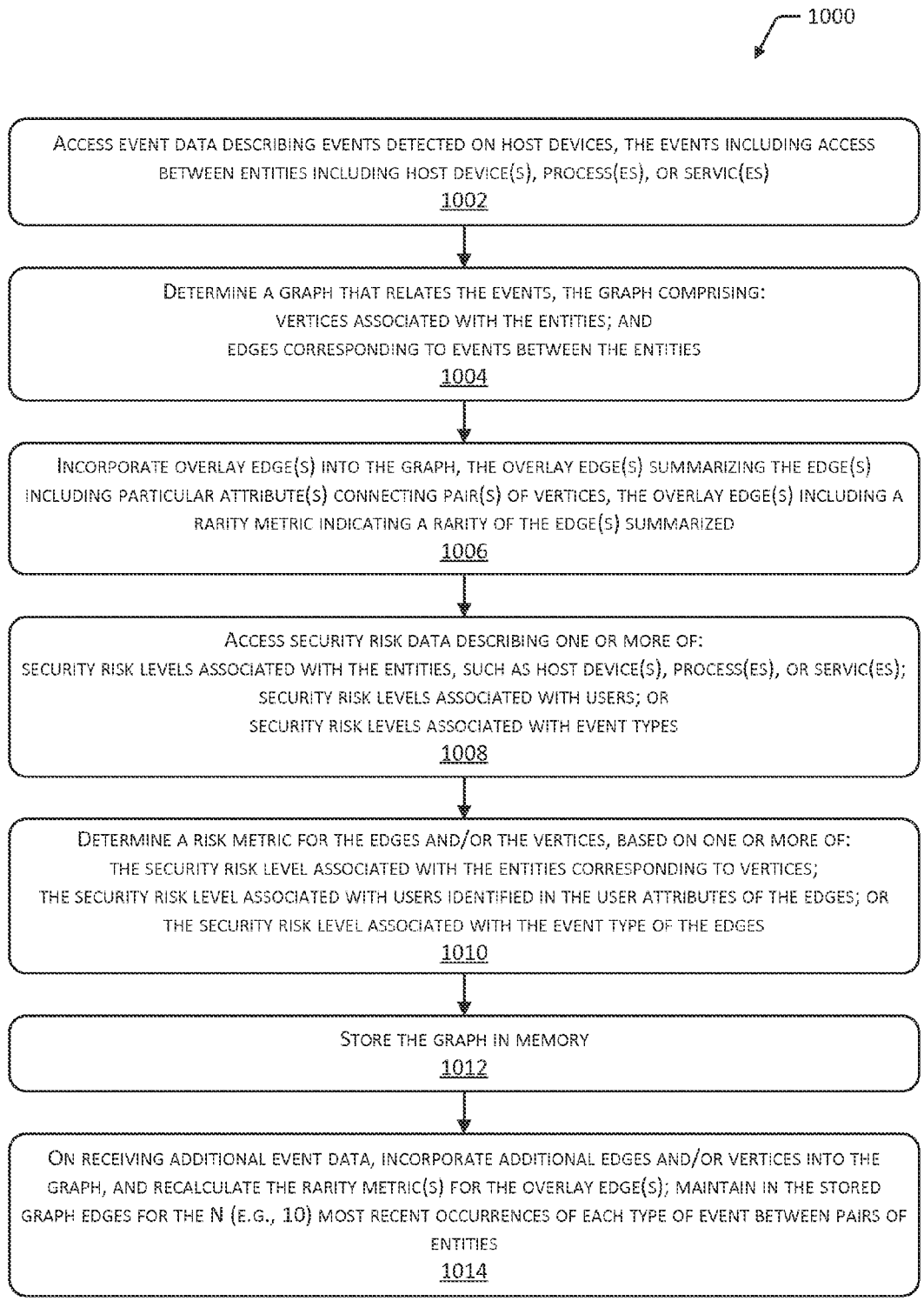
FIG. 10 depicts a flow diagram of a process for generating a graph that correlates multiple events present in the event data, the graph including a rarity metric indicating a rarity or frequency of events of a particular type between pairs of entities, the graph further including a risk metric indicating a security risk of the event(s) or the entities involved in the event(s).

FIG. 10 depicts a flow diagram 1000 of a process for generating a graph 118 that correlates multiple events present in the event data 110. One or more operations of the process may be performed by the graph generation module 116, the rarity analysis module 914, the risk analysis module 916, other modules executing on the analysis device(s) 114, or modules executing on other devices.

At 1002, the event data 110 is accessed. As described above with reference to FIGS. 2 and 3, the event data 110 may describe one or more events detected on the host device(s) 102. In some cases, the events may describe an access of a first entity to a second entity, where the first and second entities may include but are not limited to host device(s) 102, process(es) 104, or service(s) 106.

At 1004, a graph 118 is determined that relates at least a portion of the events described in the event data 110. As described above with reference to FIGS. 4-6, the graph 118 may comprise a plurality of vertices 402 each associated with an entity, such as a host device 102, a process 104, or a service 106 that acts as either an initiator or a target of one or more events. The graph 118 may also comprise one or more edges 404(1) each corresponding to an event involving two entities.

At 1006, one or more overlay edges 404(2) may be incorporated into the graph 118 determined at 1004. As described above with reference to FIG. 5, an overlay edge 404(2) may connect a pair of vertices 402 and may summarize the edge(s) 404(1) that include a particular set of attributes and that connect the pair of vertices 402. An overlay edge 404(2) may summarize the edge(s) 404(1) that include a particular event type attribute 408. In some cases, an overlay edge 404(2) may summarize the edge(s) 404(1) that include a particular event type attribute 408 as well as particular values for other attributes, such as the user attribute 410. An overlay edge 404(2) may also include the rarity metric 502 that indicates a rarity or a frequency of the edge(s) 404(1) summarized by the overlay edge 404(2).

At 1008, the security risk data 924 may be accessed. The security risk data 924 may describe a security risk level associated with one or more particular entities, such as host devices 102, processes 104, or services 106. The security risk data 924 may also indicate the security risk level associated with particular types of entities, such as classes or categories of host devices 102, processes 104, or services 106. In some cases, the security risk data 924 may indicate the security risk level associated with particular users or user groups identified by the user ID(s) 212. The security risk data 924 may also indicate the security risk level associated with particular event type(s) 210. The security risk level(s) described in the security risk data 924 may include numeric levels of any range or granularity, or may include descriptive levels (e.g., high, medium, or low risk).

At 1010, the risk metric 412 may be determined for one or more edge(s) 404 of the graph 118, based on the security risk data 924. The risk metric 412 for an edge 404 may be based on the security risk levels associated with the two entities involved in the event corresponding to the edge 404. The risk metric 412 for an edge 404 may be based on the security risk level associated with a user identified in the user attribute 410, such as the user whose credentials were employed to establish a network connection, log in to a host device 102 or service 106, and so forth. In some cases, the risk metric 412 for an edge 404 may be based on the security risk level associated with the event type 210 identified in the event type attribute 408 of the edge 404. In some implementations, a risk metric 412 may be assigned to one or both of the vertices 402 connected by the edge 404, in addition to or instead of the risk metric 412 included in the edge 404.

At 1012, the graph 118 including the risk metric(s) 412 and the rarity metric(s) 502 in the overlay edge(s) 404(2) may be stored in the memory 910 on the analysis device(s) 114 or elsewhere. The graph 118 may be stored in the active, working memory for a process executing on the analysis device(s) 114 or elsewhere, or in persistent, non-volatile storage (e.g., the hard drive or flash memory) on the analysis device(s) 114 or elsewhere.

At 1014, on receiving additional event data 110 the graph 118 may be modified to incorporate one or more additional edges 404 corresponding to recently detected events on the host device(s) 102. The graph 118 may also be modified to incorporate one or more additional vertices 402, in cases where the recently detected events involve entities not already described by vertices 402 in the graph 118. The graph 118 may also be modified to recalculate the rarity metric 502 for one or more overlay edges 404(2) based on the recently detected events. In some implementations, the graph 118 may be stored such that a predetermined number (e.g., 10) of the recent edges 404(1) are included in the graph 118 with older edge information summarized using the overlay edge(s) 404 (2). In this way, the graph 118 may include a description of the recent event data 110, while limiting the amount of storage space for storing the graph 118.

Figure 11:
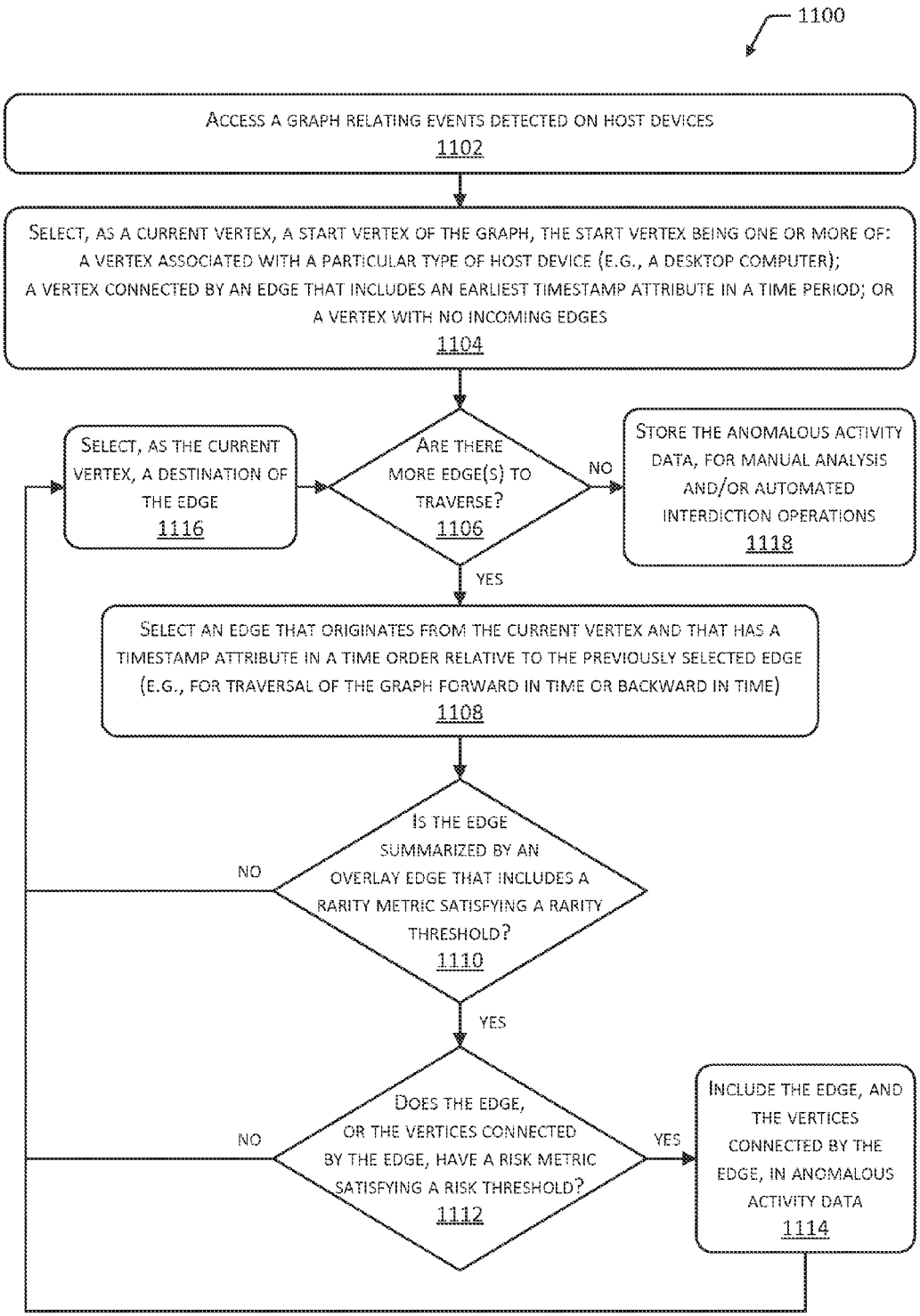
FIG. 11 depicts a flow diagram of a process for traversing or otherwise analyzing a graph to identify anomalous activity that includes chains of related events for which the rarity metric and the risk metric each satisfy a threshold.

FIG. 11 depicts a flow diagram 1100 of a process for traversing or otherwise analyzing a graph to identify anomalous activity that includes chains of related events for which the rarity metric and the risk metric are each at least a threshold. One or more operations of the process may be performed by the graph analysis module 120, the interdiction module 918, other modules executing on the analysis device(s) 114, or modules executing on other devices.

At 1102, a graph 118 may be accessed. As described above, the graph 118 may relate a plurality of events detected on the host device(s) 102.

At 1104, a start vertex 402 of the graph 118 is selected. The start vertex 402 may be selected based on one or more of the following: a vertex 402 associated with a particular type of entity, such as a host device 102 that is a desktop computer; a vertex 402 connected to an edge 404(1) that includes an earliest timestamp attribute 406 in a predetermined time period among the edges 404(1) in the graph 118; or a vertex 402 that is connected to no incoming edges 404. In some cases, the start vertex 402 may also be determined through random selection, or may be manually selected. The start vertex 402 may be designated as a current vertex 402 in an iterative algorithm to traverse the graph 118. In cases where the start vertex 402 is selected based at least partly on the vertex 402 connected to an edge 404(1) that includes an earliest timestamp attribute 406 in a predetermined time period, the time period may be a recent time window such as a most recent day, week, month, and so forth. In some cases, the time period may span all, or a portion of, the time period during which the event data 110 was collected. In some implementations, the start vertex 402 may be selected that has an outbound edge 404 including an attribute of a particular value, such as a particular event type attribute 408.

At 1106, a determination is made whether there are additional edge(s) 404 to traverse, such as outgoing edge(s) 404 from the current vertex 402. If so the process proceeds to 1108.

At 1108, an edge 404 is selected that originates from the current vertex 402 and that has a timestamp attribute 406 later than the previously selected (e.g., previously traversed) edge 404, in cases where the graph 118 is traversed forward in time. Alternatively, the graph 118 may be traversed backward in time. In that case, the edge 404 may be selected that terminates in the current vertex 402 and that has a timestamp attribute 406 earlier than the previously selected edge 404.

At 1110, a determination is made whether the edge 404 is summarized by an overlay edge 404(2) that includes a rarity metric 502 of at least a predetermined rarity threshold. If not, the process may return to 1106 and determine whether there are additional edge(s) 404 to traverse. If so, the process may proceed to 1112.

At 1112, a determination is made whether the edge 404, or the vertices 402 connected by the edge 404, include a risk metric 412 that satisfies a predetermined risk threshold. If not, the process may return to 1106 and determine whether there are additional edge(s) 404 to traverse. If so, the process may proceed to 1114.

At 1114, the current edge 404, and the vertices 402 connected by the current edge 404, may be included in the subset of the graph 118 to be stored as anomalous activity data 122. At 1116, a next current vertex 402 may be selected as the vertex 402 that is destination or target of the edge 404. The process may then proceed to 1106 and determine whether there are additional edge(s) 404 to traverse, e.g., edge(s) 404 that originate from the current vertex 402 or from vertices 402 that were previously analyzed in a depth-first or breadth-first traversal of the graph 118.

At 1106, if it is determined that there are no additional edge(s) 404 to traverse, the process may proceed to 1118. At 1118, the anomalous activity data 122 may be stored on the analysis device(s) 114 or elsewhere, and made available for manual analysis or automated interdiction operations as described above.

Although FIG. 11 depicts implementations in which both the rarity metric 502 and the risk metric 412 are employed during the traversal of the graph 118, implementations are not so limited. In some implementations, the traversal of the graph 118 may be based on those edge(s) 404 that satisfy the rarity threshold, without regard to the risk threshold. Implementations also support the traversal of the graph 118 based on those edge(s) 404 that satisfy the risk threshold, without regard to the rarity threshold. Moreover, implementations support any combination of rarity and risk threshold for traversing the graph 118. For example, in some implementations the edge(s) 404 may be designated for inclusion in the anomalous activity data 122 if the risk metric 412 is at or above a predetermined risk threshold (e.g., for higher-risk events) and if the rarity metric 502 is at or below a predetermined rarity threshold (e.g., for more frequent events). As another example, in some implementations the edge(s) 404 may be designated for inclusion in the anomalous activity data 122 if the risk metric 412 is at or below a predetermined risk threshold and if the rarity metric is at or above a predetermined rarity threshold, e.g., to select low risk and low frequency events. Accordingly, implementations support the use of the rarity and risk thresholds to select, for inclusion in the anomalous activity data 122, low risk and low frequency events, low risk and high frequency events, high risk and low frequency events, or high risk and high frequency events.

One or both of the rarity threshold or the risk threshold may be tuned manually based on performance considerations such as a time to complete the traversal, the amount of data included in the graph 118, the processing or memory resources available for performing the graph analysis, and so forth. One or both of the thresholds may also be adjusted to affect the degree of security risk detection through graph traversal. For example, one or both of the risk threshold and the rarity threshold may be increased following a graph traversal that identifies a number of false positives. Such false positives may include one or more events described in the anomalous activity data 122 that, on further examination, are identified as not corresponding to attacks or exploits.

The anomalous activity data 122 may include a chain or tree of linked tuples vertex-edge-vertex, each tuples corresponding to an event involving two entities. Code Example 1 provides an example pseudo-code description of the process to traverse the graph 118 and identify the anomalous activity data 122 as an anomalous activity chain of events.

Code Example 1 function find_activity_chain is:
input: (v1,e1,v2), rarity_threshold, risk_threshold
output: tree of linked v,e,v tuples meeting rarity and risk constraints—for example [[v, e, v], [v, e, [[v, e, v], [v, e, v],[v, e, [[v, e, v], [v, e, v]]]]]]
1. create a new variable called activity_chain with a value of empty array
2. retrieve the tuple (v1,e1',v2) from the graph by generalizing (v1,e1,v2)
3. if the rarity metric of e1' is less than rarity_threshold AND the risk metric of e1 is less than risk_threshold AND the risk metric of v2 is less than risk_threshold, return NULL
4. insert [v1, e1, v2] into activity_chain
5. for each inbound edge to v1 where timestamp is previous to the timestamp on e1 define (v,e,v1)
   1. insert call find_activity_chain (v,e,v1) into activity_chain unless NULL
6. return activity_chain
end find_activity_chain Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
accessing event data describing a plurality of events associated with a plurality of host devices, individual ones of the plurality of events including an interaction between a first entity and a second entity, the first and second entities including two of:
   a host device of the plurality of host devices;
   a process that is executable on at least one of the host devices; or
   a service that is provided by the plurality of host devices, the service comprising a plurality of executable processes;
generating a graph based at least partially on the event data, the graph relating the plurality of events, wherein the graph includes:
   a plurality of vertices, individual ones of the plurality of vertices associated with one of the first or second entities included in the plurality of events; and
   a plurality of edges, individual ones of the plurality of edges indicating an event by connecting two of the plurality of vertices corresponding to the first and second entities included in the event, individual ones of the plurality of edges including:
      a type attribute indicating a type of the event; and
      a timestamp attribute indicating a time when the event occurred;
determining a rarity metric associated with one or more of the plurality of edges, the rarity metric of an edge being based on a number of edges that include a same type attribute as the edge and that connect a same two vertices as the edge;
determining a risk metric of one or more of the plurality of edges, the risk metric of the edge indicating a degree of security risk associated with the event corresponding to the edge;
determining a start vertex associated with an earliest timestamp attribute within a time period;

traversing the graph, beginning from the start vertex, along at least a portion of the plurality of edges, wherein each successive traversed edge includes a timestamp attribute greater than that of a previously traversed edge to identify a subset of the plurality of edges for which the rarity metric satisfies a rarity threshold and the risk metric satisfies a risk threshold;

determining the subset of the plurality of edges for which the rarity metric satisfies the rarity threshold and the risk metric satisfies the risk threshold to indicate anomalous activity;

storing data indicative of the subset of the plurality of edges as anomalous activity data for determining a pattern of anomalous activity within the plurality of host devices; and performing one or more interdiction operations based on the anomalous activity data, the one or more interdiction operations including suspending a communication with at least one host device indicated by the anomalous activity data.

2. The method of claim 1, wherein:
the one or more of the plurality of edges further include a user attribute indicating a user associated with the event; and
the risk metric of an edge is based on access privileges of the user.

3. The method of claim 1, wherein:
at least one edge of the plurality of edges indicates a network connection event associated with a network connection between the first entity and the second entity; and
the risk metric of the at least one edge is based on whether the network connection is encrypted.

4. The method of claim 1, wherein the start vertex is associated with the first entity that corresponds to a desktop computing device and that is connected by the edge that includes the earliest timestamp attribute within the time period.

5. The method of claim 1, further comprising:
determining the type attribute to be associated with at least two edges connecting a first vertex and a second vertex;
determining one or more summary attribute values based on attribute values associated with the at least two edges;
providing the graph with an overlay edge associated with the type attribute and the one or more summary attribute values; and
associating the rarity metric with the overlay edge.

6. A system, comprising:
at least one computing device configured to implement one or more services, wherein the one or more services are configured to:
generate a graph corresponding to a plurality of events, individual ones of the plurality of events including an interaction between entities present in a plurality of host devices, the entities including at least two of: a host device, a process, or a service, the graph comprising:
a plurality of vertices, individual ones of the plurality of vertices associated with one of the entities included in the plurality of events; and
a plurality of edges, individual ones of the plurality of edges indicating an event by connecting two of the plurality of vertices corresponding to the entities included in the event, individual ones of the plurality of edges including a timestamp attribute indicating a time when the event occurred;
determine a rarity metric of one or more of the plurality of edges, the rarity metric of an edge being based at least partly on a number of edges that connect a same two vertices as the edge;

traverse the graph along at least a portion of the plurality of edges in an order in which each successive edge traversed includes the timestamp attribute greater than that of a previously traversed edge to identify a subset of the plurality of edges for which the rarity metric satisfies a rarity threshold;

determine the subset of the plurality of edges for which the rarity metric satisfies the rarity threshold to indicate anomalous activity;

store data indicative of the subset of the plurality of edges as anomalous activity data for determining a pattern of anomalous activity within the plurality of host devices; and suspend a communication with at least one host device indicated by the anomalous activity data.

7. The system of claim 6, wherein:
individual ones of the plurality of edges include a type attribute indicating a type of the event; and
the rarity metric of the edge is based on the number of edges that include a same type attribute as the edge and that connect the same two vertices as the edge.

8. The system of claim 6, wherein:
individual ones of the plurality of edges include a type attribute and a user attribute, the type attribute indicating a type of the event and the user attribute indicating a user associated with the event; and
the rarity metric of the edge is based on the number of edges that include a same type attribute as the edge, that include a same user attribute as the edge, and that connect the same two vertices as the edge.

9. The system of claim 6, wherein:
the one or more services are further configured to determine a risk metric of one or more of the plurality of edges, the risk metric of the edge indicating a degree of security risk associated with the event corresponding to the edge; and
the traversing of the graph identifies the subset of the plurality of edges for which the rarity metric satisfies the rarity threshold and the risk metric satisfies a risk threshold.

10. The system of claim 9, wherein:
one or more of the plurality of edges further include a user attribute indicating a user associated with the event; and
the risk metric of the edge is based on access privileges of the user.

11. The system of claim 9, wherein:
at least one edge of the plurality of edges indicates a network connection event associated with a network connection between the entities; and
the risk metric of the at least one edge is based on whether the network connection is encrypted.

12. The system of claim 9, wherein:
at least one of the entities is the host device;
at least one edge of the plurality of edges indicates a data access event including an access to data stored on the host device; and
the risk metric of the at least one edge is based on whether the data includes confidential data.

13. The system of claim 6, the traversing of the graph further comprising:
selecting a start vertex from the plurality of vertices, the start vertex being one or more of:
a vertex that corresponds to a desktop computing device; or
the vertex that is connected by the edge that includes an earliest timestamp attribute within a time period; and
the traversing of the graph beginning from the start vertex.

14. The system of claim 6, wherein the one or more services are further configured to:
- determine a common attribute value to be associated with at least two edges connecting a first vertex and a second vertex;
- determine one or more summary attribute values based on attribute values associated with the at least two edges;
- provide the graph with an overlay edge associated with the common attribute value and the one or more summary attribute values;
- remove the at least two edges from the graph; and
- associate the rarity metric with the overlay edge.

15. One or more non-transitory computer-readable media storing instructions which, when executed by at least one processor, instruct the at least one processor to perform actions comprising:
- generating a graph corresponding to a plurality of events, individual ones of the plurality of events including interactions between entities present in a plurality of host devices, the entities including at least two of: a host device, a process, or a service, the graph including:
  - a plurality of vertices, individual ones of the plurality of vertices associated with one of the entities included in the plurality of events; and
  - a plurality of edges, individual ones of the plurality of edges indicating an event by connecting two of the plurality of vertices corresponding to the entities included in the event, individual ones of the plurality of edges including a timestamp attribute indicating a time when the event occurred;
- determining a risk metric of one or more of the plurality of edges, the risk metric of an edge indicating a degree of security risk associated with the event corresponding to the edge;
- traversing the graph along at least a portion of the plurality of edges in an order in which each successive edge traversed includes a timestamp attribute greater than that of a previously traversed edge to identify a subset of the plurality of edges for which the risk metric satisfies a risk threshold;
- determining the subset of the plurality of edges for which the risk metric satisfies the risk threshold to indicate anomalous activity;
- storing data indicative of the subset of the plurality of edges as anomalous activity data for determining a pattern of anomalous activity within the plurality of host devices; and
- performing one or more interdiction operations based on the anomalous activity data, the one or more interdiction operations including suspending communications with at least one host device indicated by the anomalous activity data.

16. The one or more non-transitory computer-readable media of claim 15, wherein:
- the actions further comprise determining a rarity metric of one or more of the plurality of edges, the rarity metric of the one or more of the plurality of edges being based at least partly on a number of edges that connect a same two vertices as the edge; and
- the traversing of the graph identifies the subset of the plurality of edges for which the rarity metric satisfies a rarity threshold and the risk metric satisfies the risk threshold.

17. The one or more non-transitory computer-readable media of claim 15, the traversing of the graph further comprising:
- selecting a start vertex from the plurality of vertices, the start vertex being one or more of:
  - a vertex that corresponds to a desktop computing device; or
  - the vertex that is connected by the edge that includes an earliest timestamp attribute within a time period; and
- the traversing of the graph beginning from the start vertex.

18. The one or more non-transitory computer-readable media of claim 15, wherein:
- individual ones of the plurality of edges include a directionality from a first vertex to a second vertex;
- the first vertex corresponds to a first entity that initiates the event; and
- the second vertex corresponds to a second entity that is a target of the event.

19. The one or more non-transitory computer-readable media of claim 15, wherein:
- individual ones of the plurality of edges further include a user attribute indicating a user associated with the event; and
- the risk metric of the edge is based on access privileges of the user.

20. The one or more non-transitory computer-readable media of claim 15, the actions further comprising:
- determining a common attribute value to be associated with at least two edges connecting a first vertex and a second vertex;
- determine one or more summary attribute values based on attribute values associated with the at least two edges;
- provide the graph with an overlay edge associated with the common attribute value and the one or more summary attribute values;
- determine a rarity metric associated with the overlay edge, wherein the rarity metric is based at least partly on a number of edges connecting the first vertex and the second vertex.

* * * * *